United States Patent [19]

Pincon

[11] Patent Number: 4,517,084

[45] Date of Patent: May 14, 1985

[54] ACTIVATED AIR AND ION EXCHANGE TREATMENT OF WATER

[76] Inventor: Andrew J. Pincon, 421 Liberty Dr., Bolingbrook, Ill. 60439

[21] Appl. No.: 439,340

[22] Filed: Nov. 5, 1982

[51] Int. Cl.³ .............................................. A01K 63/00
[52] U.S. Cl. ........................................ 210/169; 119/3;
 210/190; 210/192; 210/195.1; 210/269;
 210/416.2
[58] Field of Search ............... 119/3, 5; 210/169, 190,
 210/192, 195.1, 416.1, 416.2, 748, 760, 764, 765,
 668, 677, 269, 220, 221.2

[56] References Cited

U.S. PATENT DOCUMENTS

| | | | |
|---|---|---|---|
| 3,661,262 | 5/1972 | Sanders | 210/169 |
| 4,052,960 | 10/1977 | Birkbeck et al. | 119/3 |
| 4,214,962 | 7/1980 | Pincon | 210/760 |
| 4,332,678 | 6/1982 | Spiegl | 210/190 |

FOREIGN PATENT DOCUMENTS

| | | |
|---|---|---|
| 2307877 | 5/1974 | Fed. Rep. of Germany . |
| 2719638 | 9/1978 | Fed. Rep. of Germany . |
| WO81/01526 | 6/1981 | PCT Int'l Appl. . |

*Primary Examiner*—Richard V. Fisher
*Assistant Examiner*—W. Gary Jones
*Attorney, Agent, or Firm*—Marshall, O'Toole, Gerstein, Murray & Bicknell

[57] ABSTRACT

An activated air treatment for water purification utilizes an ultraviolet irradiated activated air stream dispersed into a water tank. Water is continuously circulated through a filter and ion exchange beds and returned to the tank. The ion exchange beds are sequentially regenerated by a closed loop salt water system. The regenerating liquid is treated by a second activated air stream.

3 Claims, 1 Drawing Figure

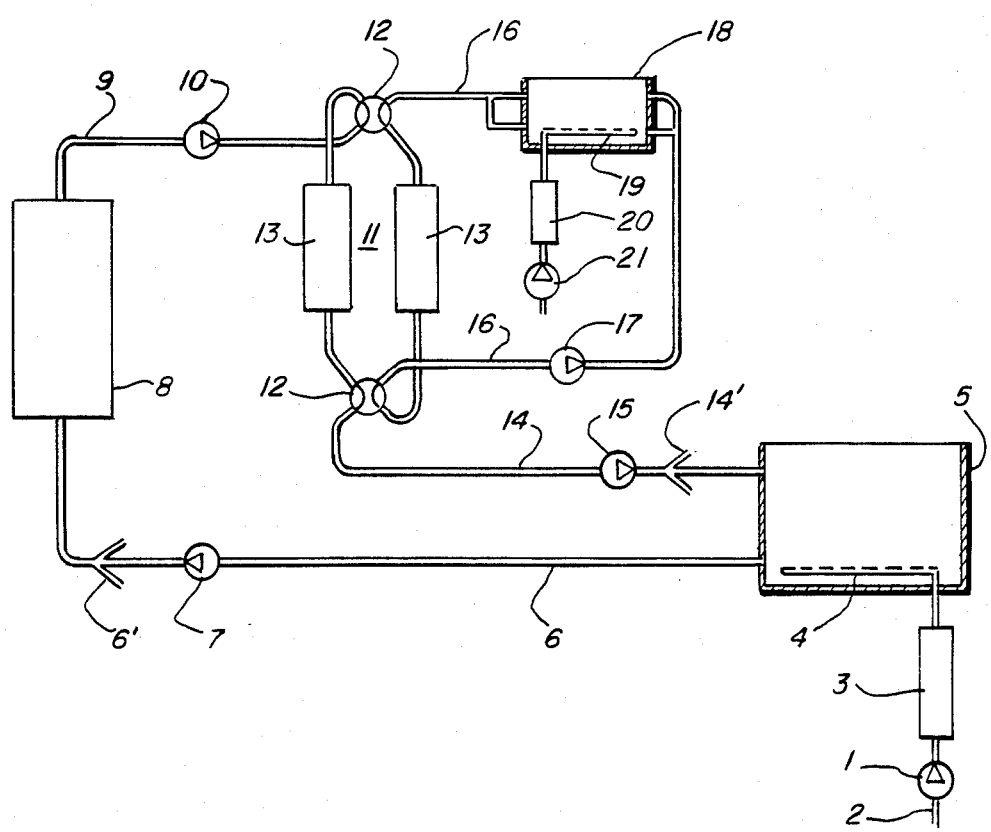

ACTIVATED AIR AND ION EXCHANGE TREATMENT OF WATER

Current water treatment methods are not suitable for several purposes. An example thereof is fish breeding, also called fish farming. The fishes are kept in basins, and the water therein is continuously contaminated by the excrements of the fishes and by uneaten food. These contaminants sink to the bottom and cannot be removed by simply refreshing the water. These contaminants will not only promote the development of micro-organisms which are often noxious for the fishes, but the decomposing contaminants and such micro-organisms will consume a substantial part of the oxygen present in the water, so that an insufficient amount thereof will be available for the fishes. All this will lead to a slow growth and a high mortality of the fishes, and, thus, to substantial financial losses. Furthermore fish farming can be limited by the fact that the available natural water is contaminated by industrial pollutants, fertilizers, pesticides and the like, or by water shortage.

In view of the fact that fish farming may be a solution for protein shortages in many parts of the world, finding a solution for the purification of fish farming basins is an important object.

Aeration and filtration of the water of such a basin has proved to be insufficient, since, in view of the large amounts of water to be continuously filtered, the filters, in particular sand filters, become very bulky and expensive, and these filters must be repeatedly washed back to remove the organic matter filtered out, which requires very large amounts of water which are to be discharged, and this solution has proved to be too expensive for economically operating a fish farm. The same holds for so-called biological filters in which the organic matter present in the water is digested by micro-organisms.

Similar problems arise in other cases in which organic matter has to be removed from water, such as in swimming pools, laundries, and also in drinking or sewage water treatment plants.

One has already tried to attack such organic contamination by means of strong oxidants, in particular ozone, but also this has proved to be inefficient, in particular in those cases that the ozone containing water itself or the escaping ozone may be harmful for humans or animals. Ozone is generally produced by means of electrical discharges in air, which requires much energy, and, because of the rather fast dissocation of ozone, an excess amount thereof is to be used. Moreover not only the oxygen of the treated air is affected by the discharges, but also the nitrogen will be excited, dissociated and/or ionized, which will lead to the formation of noxious nitrogen oxides, and such oxides will be formed at the expense of the ozone. The ozone concentration cannot be raised beyond a given limit because of its noxious effects on living matter, which is, of course, very important in the case of fish farming. Another disadvantage is that ozone increases the surface tension of the water which will unfavourably influence the filtration of the water.

Using ion exchangers for removing dissolved contaminants, e.g. ammonia which is a product of the decomposition of organic matter, has been contemplated, but this has proved to be an inefficient solution too, since the active surfaces of such ion exchangers are quickly covered by slimy organic decomposition products or residues, so that they have to be cleaned and/or regenerated at short intervals which is not economically feasible.

It is an object of the invention to provide a simple system of relatively small dimensions for efficiently treating water containing organic contaminants in a substantially closed loop without noxious or toxic effects on humans and animals, which system is, in particular, suitable for fish farming purposes, even in regions with a water shortage or with heavily polluted natural water sources, and requires relatively little energy and maintenance.

From U.S. Pat. No. 4,214,962 a method and an apparatus are known for forming so-called activated oxygen, in which air is led through a space containing lamps emitting radiation with a wave-length of about 200 nm. This radiation will selectively affect the oxygen in the air, and not the nitrogen, so that no harmful nitrogen oxides and the like will be produced. The oxygen is excited, ionized and/or dissociated, and in the presence of water, e.g., water vapour carried by the air, oxygen-hydrogen compounds can be formed. Also ozone can be formed, but its concentration is relatively low, so that the safety limits will not be exceeded. Moreover the activated oxygen has proved, in contrast to ozone, to lower the surface tension of water.

Now the activated oxygen, or better air consisting of activated oxygen and not activated inert nitrogen, has proved to be very effective for treating water containing organic matter, in particular but not exclusively for the above-mentioned fish farming purposes.

The invention provides a system for such a water treatment, which is characterised by a container for the water to be treated, by means for dispersing air into the water present in said container, by an apparatus for activating air by irradiation with short-wave radiation, in particular of about 200 nm, by an air pump for supplying air to said apparatus, by a water circulating duct connected to the lower part of said container and provided with water circulating means such as one or more pumps, the other end of said duct opening in the upper part of said container, and by filter means included in said duct and being adapted to remove residual organic matter and/or decomposition products suspended therein.

The activated air introduced into the water is effective to decompose the greater part of the organic matter present in the water without unfavourably affecting higher animals or plants living therein. Therefore the development of micro-organisms living on such organic matter is suppressed, and the decomposition of this matter will not lead to a reduction of the amount of dissolved oxygen. In fact this amount will be kept at the optimal value by the surplus air, so that optimal living conditions for animals and plants will be provided.

As a consequence of the fact that a substantial part of organic matter is decomposed in this manner, the remainder thereof can be effectively removed in a simple filter, and the reduction of the surface tension of the water by the dissolved activated oxygen contributes to the filtering effect, and, in particular, one common filter of moderate dimensions can be used for a plurality of water basins or containers which are each provided with an individual activating apparatus, and back washing said filter will only be necessary at relatively long intervals. The over-all dimensions of the system will, therefore, be mainly determined by the dimensions of the water basins or containers.

Since, now, the organic matter can be substantially removed from the water in a simple and relatively inexpensive manner, it becomes possible to use ion exchangers for removing dissolved substances not affected by the activated oxygen, such as ammonia, without the risk of these exchangers being incativated by slimy organic residues. These ion exchangers can be regenerated by means of water, in particular salt water, and discharging this water containing ammonia can be a problem in some circumstances. It has, however, appeared that the water used for regenerating the ion exchangers can be cleaned by means of activated air too, so that it can be used again for regeneration in a closed circuit.

Preferably the ion exchangers are duplicated, one set being used for treating the water in the main circuit, and the other being regenerated, suitable valves being used for interchanging the exchangers at the end of a regenerating period.

The invention will be elucidated below by reference to a drawing, showing a diagrammatic representation of a preferred embodiment of a system according to the invention.

The system shown in the drawing comprises an air pump 1 having a suction duct 2 opening in the air, and its pressure side is connected to an apparatus 3 for irradiating the air supplied thereby with short-wave radiation, in particular with a wave-length of about 200 nm, e.g. as described in U.S. Pat. No. 4,214,962. The output end of said apparatus is connected to an air dispersing means 4 arranged near the bottom of a water basin or container 5.

The basin 5 is, for instance, used for breeding fish for commercial purposes, but can also be a swimming pool, or a vessel for purifying washing water from a laundry, waste water from a meat packing factory, or any other polluted water from which organic matter is to be removed.

With the basin 5 a water discharged duct 6 is connected which is, if required, provided with a pump 7, and which leads to a water filter 8, in particular a sand filter. As indicated at 6', a plurality of ducts 6 can be connected to one single filter 8.

The output duct 9 of this filter 8 is connected, if required by means of a pump 10, to an ion-exchange assembly 11, consisting of two four-way valves 12 and two ion exchangers 13, one valve 12 being connected to the duct 9, and the other one to a return duct 14, provided, if necessary, with a pump 15, and ending in the upper part of the basin 5. As indicated at 14', the return duct 14 may be connected to a plurality of basins 5.

The valves 12 are, furthermore, connected to a duct 16 comprising a pump 17 and a water treatment vessel 18, the latter being provided with an air dispersing means 19, connected to an activating apparatus 20 of the same kind as the apparatus 3, and connected to an air pump 21.

In a first position of the valves 12, the left hand ion exchanger is included in the circuit of the ducts 9 and 14, and the other exchanger is connected in the closed circuit of the duct 16. In the second position of said valves the ion exchangers are interchanged. It will be clear that, instead of said four-way valves, separate and, if desired, mutually coupled valves can be used.

The air activated in the apparatus 3 and dispersed into the water of the basin 5 will attack organic matter present in said basin. Since the disperser 4 is situated near the bottom of said basin, organic matters sunk towards the bottom will be whirled up and, thus, will be brought continuously in contact with the air.

The water is continuously discharged through the duct 6 towards the filter 8, and is, after being stripped of any remaining suspended matter, led towards one of the ion exchangers, in which dissolved contaminants, in particular ammonia and the like, are removed. The treated water is, eventually, returned towards the basin 5.

The other ion exchanger not used for removing dissolved contaminants is regenerated by water, in particular salt water, which is supplied from the container 18 and is, after being led through said exchanger, returned to said container 18. The water circulated through this closed circuit is continuously exposed to the activated air supply by the activating apparatus 20, so that dissolved contaminants such as ammonia are oxidized thereby. Although in the basin 5 some oxidation of ammonia may occur, the activated air introduced therein will in the first place be used for attacking suspended organic matter. The vessel 18 can be designed so that the residence time of the water therein will be sufficient for effectively removing ammonia and the like therefrom.

If necessary intermediate vessels can be included in the ducts 6, 9 and/or 14 for storing water to be filtered or already filtered. The containers 5 and 18 can be open or closed containers, but in the latter case means should be provided for removing excess air, and the latter can be returned to the suction end of the air pump in question, in which case a closed air circuit is obtained through which activated air escaping from the water is recirculated, and then a high activating efficiency will be obtained.

I claim:

1. A system for removing suspended organic matter and dissolved contaminants including ammonia in water to be recycled for reuse, said system comprising:
   a tank for holding a supply of recycled water,
   a first generating means for generating activated air and a carrier air stream,
   air dispersing means near the bottom of said tank for receiving said activated air and carrier air stream in the tank and for dispersing said activated air into the tank to decompose organic matter in the tank and to travel upwardly through the water in the tank,
   a filter means having a filter media to remove suspended organic matter from water supplied thereto from said tank,
   an ion exchange means for receiving water from said filter means to remove dissolved contaminants including ammonia from the water,
   means for conveying cleaned water from said ion exchange means back to said tank, and
   a regenerating system for said ion exchange means including a vessel for holding an aqueous solution used to regenerate said ion exchange means and a second generating means for generating activated air and a carrier air stream and a second dispersing means in said vessel to disperse air and activated air from said second generating means in said vessel to oxidize dissolved contaminants including ammonia removed from said ion exchange means and returned to said vessel in said aqueous solution.

2. A system in accordance with claim 1 in which said ion exchange means comprises first and second ion exchangers one of which is selectively connected to the water vessel for regeneration while the other of the ion exchangers is selectively connected to the filter means and to the fresh water tank to return cleaned fresh water thereto.

3. A system in accordance with claim 2 in which the regenerating system is a closed loop system and uses sea water in said vessel.

* * * * *